United States Patent [19]

van Waveren et al.

[11] 4,325,826
[45] Apr. 20, 1982

[54] OIL SWEEPER METHOD AND APPARATUS

[75] Inventors: Peik J. van Waveren, Vlaardingen; Ary de Vrij, Puttershoek, both of Netherlands

[73] Assignee: Hydrovak Systems (Holland) B.V., Vlaardingen, Netherlands

[21] Appl. No.: 184,138

[22] Filed: Sep. 4, 1980

[51] Int. Cl.³ .............................................. E02B 15/04
[52] U.S. Cl. .................................. 210/776; 210/242.1; 210/801; 210/923; 405/63
[58] Field of Search ................... 210/242 S, 776, 923, 210/801; 49/74; 55/436, DIG. 37; 405/63

[56] References Cited

U.S. PATENT DOCUMENTS

| | | | |
|---|---|---|---|
| 2,799,061 | 7/1957 | Haday | 49/74 |
| 3,371,446 | 3/1968 | Minds, Jr. | 49/74 |
| 3,455,057 | 7/1969 | Baird | 49/74 |
| 3,563,380 | 2/1971 | Thomas | 210/242.3 |
| 3,661,263 | 5/1972 | Peterson | 210/242.3 |
| 4,014,795 | 3/1977 | Veld | 405/63 |
| 4,051,038 | 9/1977 | Veld | 210/923 |

Primary Examiner—Theodore A. Granger
Attorney, Agent, or Firm—Bacon & Thomas

[57] ABSTRACT

Oil sweeper method and apparatus including an elongated structural framework adapted to be towed transversely across the surface of water bearing an oil film contaminant, the framework supporting a pair of longitudinally extending, parallel vertical screens, wherein the forwardmost screen relative to the direction of sweeping motion is constituted of multiple panels pivotally attached to the framework for swinging movement about vertical swinging axes, and the rearward screen is water impervious. When the panels of the forwardmost screen are pivoted they define channels therebetween for diverting surface water and floating contamination such as oil in a lateral direction towards a skimmer disposed at one end of the sweeper apparatus. The rearward screen assists in further deflecting the water and oil towards the skimmer after they have traversed the channels between the pivotable panels.

7 Claims, 4 Drawing Figures

OIL SWEEPER METHOD AND APPARATUS

BACKGROUND OF THE INVENTION

I. Field of the Invention

This invention relates to method and apparatus for removing a film of oil from the surface of a body of water.

II. Description of the Prior Art

The prior art is exemplified by U.S. Pat. Nos. 3,979,291 and 4,014,795, which both describe systems for removing a film of oil floating on the surface of a body of water by means of elongated sweeper booms that sweep the oil film towards a skimmer located at one end of the sweeper apparatus. The latter patent furthermore describes a dual screen sweeper boom having vanes located beneath and between the screens of the boom for diverting oncoming surface water towards the skimmer.

The present invention is an improvement over such prior art systems that is intended to more effectively direct the oil film towards the skimmer.

SUMMARY OF THE INVENTION

The present invention is an improvement in sweeper apparatus for removing floating oil from the surface of a body of water. The sweeper comprises a dual screen elongated boom that is towed transversely across the surface of the water to be swept clean of an oil film floating thereon.

The sweeper apparatus includes forward and rearward screens, the forward screen comprising multiple panels hinged at one edge for pivotable movement about a vertical axis. When the panels are pivoted to an open position, they present open channels between themselves that are inclined towards the skimmer which is located at one end of the sweeper. When the sweeper is towed across the surface of a body of water, the oncoming water and oil film is partially deflected towards the skimmer by the open panels constituting the front screen of the sweeper apparatus. The rear screens of the sweeper further deflects the oncoming water and oil towards the skimmer. The oncoming water and oil film thus passes through the channels formed between the open panels comprising the forward screen of the sweeper.

More specifically, the invention comprises oil sweeper apparatus adapted to sweep an oil film from oncoming surface water approaching the apparatus from a generally transverse direction relative to its length, the apparatus including an elongated structural framework, floatation means for the framework, and a surface skimmer located at one end of the framework. The framework is furthermore provided with a pair of longitudinally extending, water impervious vertical screens supported on opposite longitudinal sides thereof, the forward screen comprising multiple panels that are pivotably mounted to the framework for swinging movement about a vertical swinging axis. Adjustment means are provided for setting the angles of the panels about their respective swing axis, whereby the panels can be set to establish channels therebetween for deflecting oncoming water that passes between the panels in a direction towards the skimmer. The rearward screen provided on the framework further deflects oncoming water and floating oil towards the skimmer.

DRIEF DESCRIPTION OF THE DRAWINGS

With reference to the appended drawings.

DESCRIPTION OF PREFERRED EMBODIMENT

Figure 1:
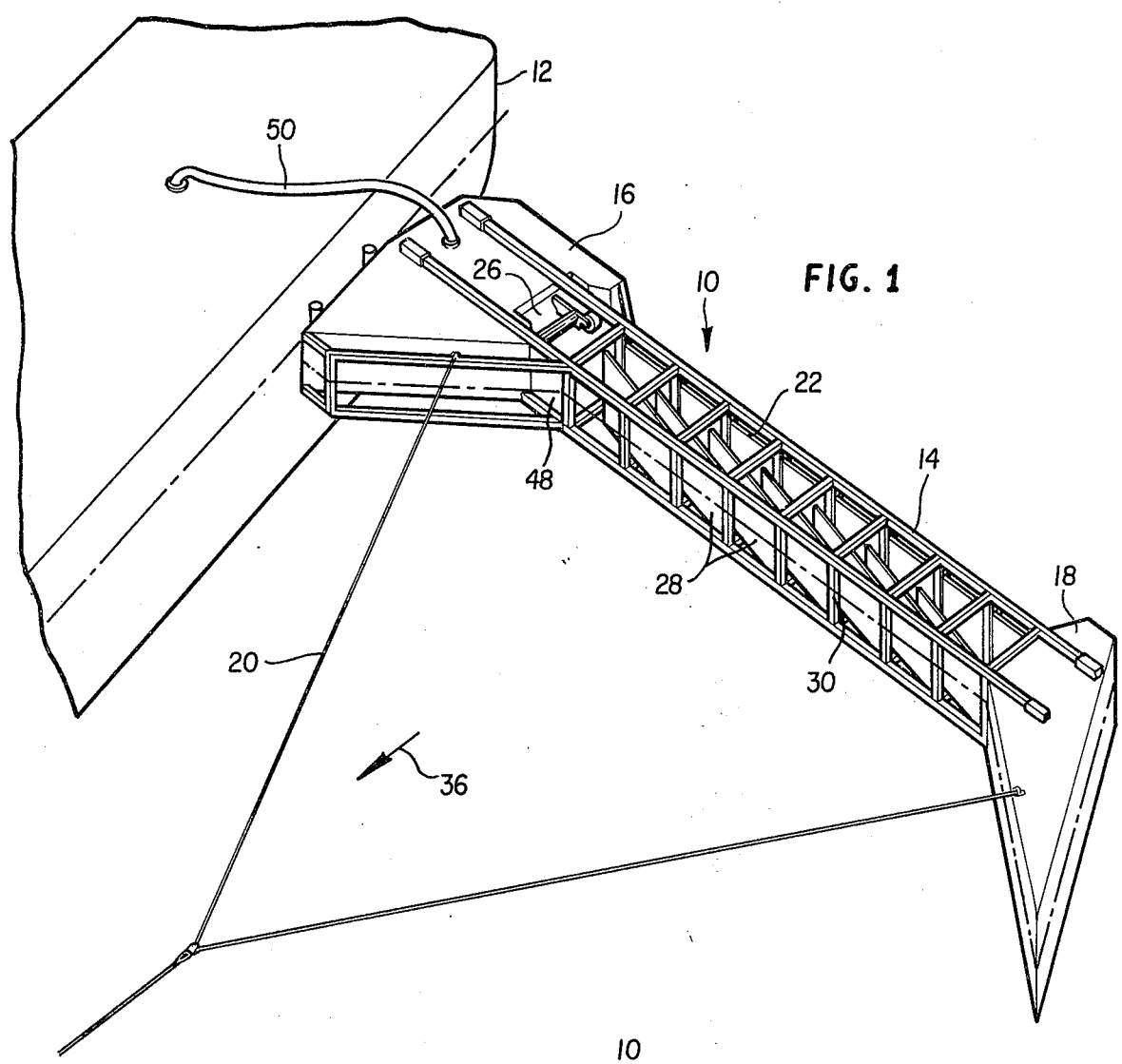
FIG. 1 is a perspective view of the sweeper apparatus embodying the present invention in its operative position.

With reference to the drawings, an oil sweeper apparatus 10 embodying the present invention is shown in its operative relationship with a vessel 12 that may be self-propelled or towed by a powered vessel. The sweeper apparatus 10 comprises an elongated structural framework 14 that may be made of rigid metal elements to provide structural stiffness along the length of the apparatus. As can be seen in FIG. 1, the structural framework 14 includes an assembly of vertical and horizontal members extending along the length of the sweeper apparatus.

The sweeper apparatus 10 is further characterized in that it is provided with float elements 16,18 that are rigidly secured to the framework 14. A cable 20 is shown secured to the apparatus permitting same to be towed laterally across the surface of a body of water to be swept clean of floating contamination, such as oil and the like.

The sweeper apparatus is furthermore provided with individually buoyant, water impervious panels 22 (FIGS. 1 and 4) that are mounted for free vertical sliding movement in vertical channels 24 constituting part of the structural framework 14. The panels 22 furthermore comprise a vertical rearward screen for deflecting surface water and floating contaminant towards a skimmer 26 located at one end of the sweeper apparatus. It will be apparent from FIG. 4 that the panels 22 are constructed in such a manner that they only partially float in water so that they extend above the water from a position that is submerged relative to the surface of the water indicated by the WL in the drawings. The panels 22 thus individually move vertically to follow wave action while blocking any floating oil film from passing through the sweeper.

The sweeper apparatus is furthermore provided with a series of forward deflector panels 28 that are secured to vertical framework members 30 by suitable hinge means 32 or the like so that they are pivotable about a vertical swing axis corresponding to the hinge axis. The forward panels 28 are also water impervious and form a front screen for the sweeper that is water impervious except when the panels are in their open position.

Figure 2:
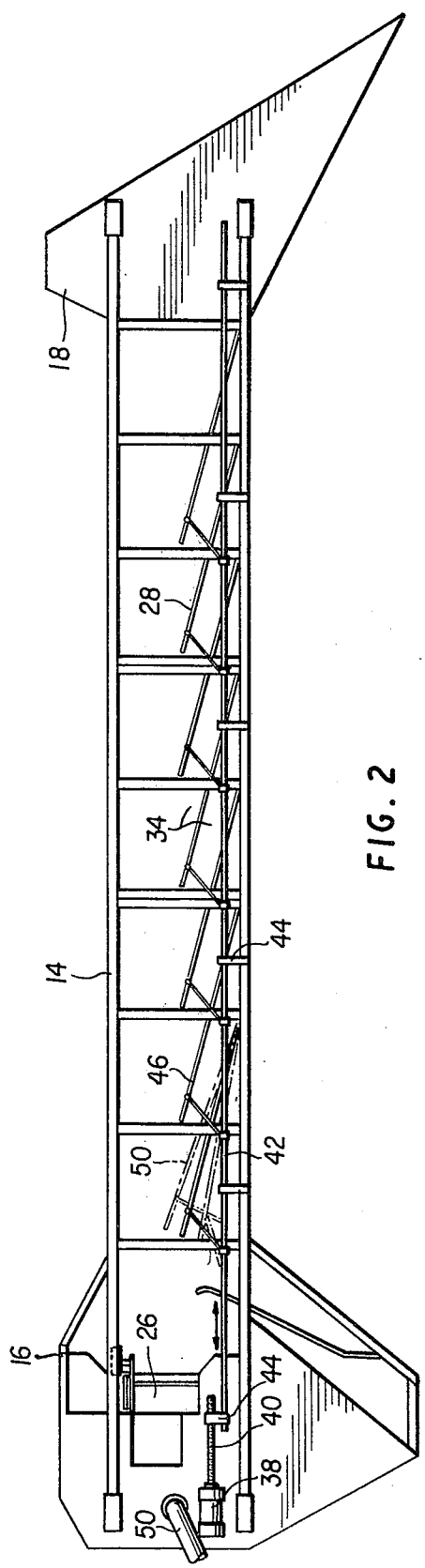
FIG. 2 is a plan view of the sweeper apparatus.
Figure 3:
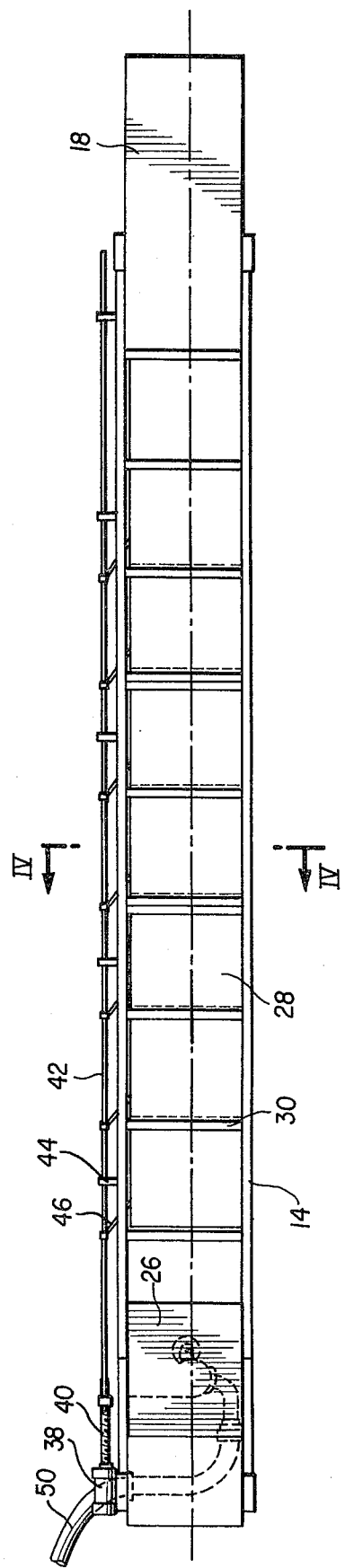
FIG. 3 is an elevational view corresponding to FIG. 2.

It will be apparent from viewing FIG. 2 that when the panels 28 are adjusted to an open position, they define channels 34 between the panels through which surface water may flow when the apparatus is towed in a direction transverse to its length as indicated by arrow 36. The panels therefore deflect oncoming surface water at least partially towards the skimmer 26 when the apparatus is towed across the surface of a body of water. Of course, the apparatus could remain stationary in a moving water current approaching same in a direction opposite to arrow 36 with the same effect and without departing from the scope of this invention.

Figure 4:
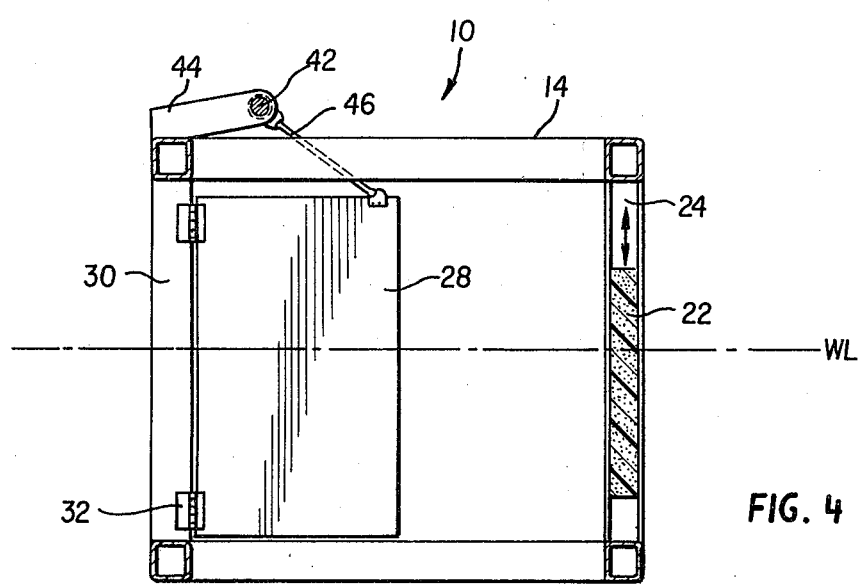
FIG. 4 is a sectional view taken along line IV—IV in FIG. 3.

The angular position of forward panels 28 is controllable by actuator 38 shown in FIG. 2 which may be motivated by any suitable source of energy, e.g. hydraulic, pneumatic, electrical, etc. The actuator 38 furthermore comprises, for example, a threaded screw shaft 40 connected to a longitudinally extending control shaft 42 that is supported as shown in FIG. 4 above the structural framework 14 by support arms 44. The control shaft 42 may be longitudinally moved by operation of the actuator 38 which rotates screw shaft 40 which in turn is connected to the control shaft 42 by a nut element 44 that converts the rotary movement of the screw shaft 40 to reciprocating movement along the length of the structural framework 14. Control shaft 42 in turn is connected to each of the panels by a linkage 46 that transmits longitudinal movement of the control shaft 42 to the panels 28.

Accordingly, longitudinal movement of the control shaft 42 causes the panels 28 to pivot about their swing axes in a manner illustrated by the hidden lines 50 in FIG. 2. This causes the channels 34 to open and close to a greater or lesser extent and also adjusts the deflection angle imparted to the oncoming surface water when it passes through the channels 34.

The skimmer 26 preferably is similar to that illustrated in U.S. Pat. No. 4,145,292. A suitable pump means (not illustrated) is associated with the skimmer 26 to constantly withdraw, during operation of the sweeper apparatus, the skimmed oil from the surface of the water. It will be apparent from FIG. 1 that even with the panels in substantially closed position, surface water and floating contaminant will be deflected by the forward and rearward screens of the sweeper apparatus towards the skimmer 26. The inboard forward end of the sweeper apparatus is open to the skimmer as shown in 48, while the inboard rearward end is closed. This causes the deflected surface water and contamination to be constantly directed to the skimmer 26 where the contaminant can be removed by a skimming action. The skimmer 26 is emptied through a hose 50 into a suitable folding compartment that may be provided within the vessel 12. If desired, further separation of oil from contamination can be carried out within vessel 12 while the sweeping function is being performed.

In operation, the sweeper apparatus 10 is towed transversely across the surface of a body of water, usually at an inclined angle with respect to direction of motion. Surface water and floating contamination such as an oil film is at least partially deflected towards the skimmer 26 by the forward screen panels 28 and more fully deflected in the same sense by the rearward screen panels 22. The degree of deflection is controllable by operation of the actuator 38 in conjunction with the control shaft 42 so that the angle of the panels can be set in an optimum manner to promote most efficient skimming of floating contamination from the surface of the water.

It is to be understood that any suitable control means can be utilized to adjust the angle of the forward panels 28 and that the specific illustration of an actuator and an elongated control shaft is exemplary only to illustrate a preferred embodiment. It is to be understood that the invention can be exemplified in various other embodiments without departing from the scope of this invention, which is defined in the claims set forth below.

What is claimed is:

1. Oil sweeper apparatus adapted to sweep an oil film from oncoming surface water approaching the apparatus from a generally transverse direction relative to its length, comprising:
    (a) an elongated structural framework adapted to be placed in the water;
    (b) a surface skimmer located at one end of the framework;
    (c) a pair of parallel, longitudinally extending, vertical screens supported on opposite longitudinal sides of the framework, the screens adapted to intersect the water line when the apparatus is placed in the water;
    (d) the forward screen relative to the water approach direction comprising multiple, water impervious panels, each panel pivotally mounted to the framework for swinging movement about a vertical swinging axis;
    (e) the rearward screen being impervious to water;
    (f) means for selectively adjusting and setting the angles of the pivotable panels about their respective swing axes, whereby the panels can be set to approach the rearward screen to thereby, with the rearward screen, deflect oncoming water passing across and between the panels, and between the screens, toward the skimmer.

2. A sweeper apparatus as claimed in claim 1, said panels arranged in longitudinally overlapping relationship at least when they are set at or near a closed position.

3. A sweeper apparatus as claimed in claim 1, the rearward screen comprising individual buoyant panels mounted for independent vertical movement relative to each other and the framework.

4. A sweeper apparatus as claimed in claim 1, said panel position control means comprising a central common controller arranged to simultaneously position the pivotable panels in concert.

5. A sweeper apparatus as claimed in claim 1, said common controller comprising a longitudinally extending control shaft connected to each pivotable panel by a linkage, and means for selectively actuating said control shaft.

6. A sweeper apparatus as claimed in claim 1, said skimmer located between the screens and facing towards the pivotable panels.

7. A method of removing floating contamination such as an oil film from a body of water by using an elongated sweeper apparatus towards which the water approaches laterally during use, the apparatus having individual forward panels extending along the length of the apparatus that are mounted for pivotable movement about vertical axes and facing oncoming water bearing the contamination, a rearward screen for blocking free passage of floating contamination through the apparatus, and a surface skimmer located towards one end of the apparatus and facing towards the opposite end thereof, comprising:
    deflecting portions of oncoming surface water at least partially towards the skimmer by angulating the forward panels about their respective vertical axes to provide channels between the panels for deflecting contamination towards the skimmer, and then further deflecting the same oncoming surface water and oil more directly towards the skimmer by fixed screen means located rearwardly of the pivotable panels and extending along the length of the sweeper apparatus.

* * * * *